United States Patent
Suzuki et al.

(10) Patent No.: US 9,888,149 B2
(45) Date of Patent: Feb. 6, 2018

(54) IMAGE PRINTING APPARATUS AND IMAGE PRINTING METHOD

(71) Applicant: CANON KABUSHIKI KAISHA, Tokyo (JP)

(72) Inventors: Fumiko Suzuki, Kawasaki (JP); Mayuko Yamagata, Inagi (JP); Satoshi Seki, Kawasaki (JP); Hirokazu Tanaka, Inagi (JP); Gou Sasaki, Kawasaki (JP); Tsukasa Doi, Tokyo (JP); Kiichiro Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/217,509

(22) Filed: Jul. 22, 2016

(65) Prior Publication Data
US 2017/0041501 A1 Feb. 9, 2017

(30) Foreign Application Priority Data

Aug. 7, 2015 (JP) ................................ 2015-156823

(51) Int. Cl.
 *G06K 15/00* (2006.01)
 *H04N 1/405* (2006.01)
 (Continued)

(52) U.S. Cl.
 CPC .......... *H04N 1/405* (2013.01); *G06K 15/102* (2013.01); *H04N 1/54* (2013.01); *H04N 1/6008* (2013.01)

(58) Field of Classification Search
None
See application file for complete search history.

(56) References Cited

U.S. PATENT DOCUMENTS

| 5,961,703 A | 10/1999 | Fraas |
| 6,061,145 A | 5/2000 | Kanda |

(Continued)

FOREIGN PATENT DOCUMENTS

| EP | 1 403 334 | 3/2004 |
| JP | 2002-154240 | 5/2002 |
| JP | 2011-195783 | 10/2011 |

OTHER PUBLICATIONS

European Office Action dated Dec. 19, 2016 during prosecution of related European application No. 16001641.6.

*Primary Examiner* — Dung Tran
(74) *Attorney, Agent, or Firm* — Fitzpatrick, Cella, Harper & Scinto

(57) ABSTRACT

An image printing apparatus can print an image in which graininess is suppressed while using a color material of light blue. To achieve this, the color material of light blue satisfies the following condition.

$$\Delta L_B \geq (\Delta L_C - \Delta L_B) > 0 \text{ and}$$

$$\Delta L_B \geq (\Delta L_M - \Delta L_B) > 0$$

Here, $\Delta L_C$ represents a difference in lightness between cyan ink and a blank area, $\Delta L_M$ represents a difference in lightness between magenta ink and the blank area, and $\Delta L_B$ represents a difference in lightness between light blue ink and the blank area. Further, the color material of light blue satisfies the following condition.

$$h_C + (h_{(C+M)} - h_C)/2 \leq h_B \leq h_M - (h_M - h_{(C+M)})/2$$

Here, $h_C$ represents a hue of the cyan ink, $h_M$ represents a hue of the magenta ink, $h_{(C+M)}$ represents a hue of the image printed with the cyan ink and the magenta ink in the same amount, and $h_B$ represents a hue of the light blue ink.

28 Claims, 13 Drawing Sheets

(51) Int. Cl.
*H04N 1/54* (2006.01)
*G06K 15/10* (2006.01)
*H04N 1/60* (2006.01)

(56) References Cited

U.S. PATENT DOCUMENTS

| | | | |
|---|---|---|---|
| 6,530,638 B2 * | 3/2003 | Shibata | H04N 1/54 |
| | | | 347/15 |
| 6,652,066 B2 | 11/2003 | Teshigawara | |
| 7,384,460 B2 * | 6/2008 | Hamajima | C09D 11/40 |
| | | | 106/31.27 |
| 9,064,202 B2 | 6/2015 | Tanaka | |
| 2002/0063746 A1 * | 5/2002 | Suzuki | G06K 15/105 |
| | | | 347/19 |
| 2002/0097412 A1 * | 7/2002 | Shibata | G06K 15/102 |
| | | | 358/1.9 |
| 2002/0181987 A1 | 12/2002 | Kakutani | |
| 2009/0058925 A1 * | 3/2009 | Hayashi | B41J 2/16532 |
| | | | 347/30 |
| 2012/0038708 A1 * | 2/2012 | Ishii | B41J 2/175 |
| | | | 347/40 |
| 2012/0176432 A1 * | 7/2012 | Hagiwara | B41J 2/15 |
| | | | 347/14 |
| 2017/0028739 A1 * | 2/2017 | Ohnishi | B41J 2/21 |

* cited by examiner

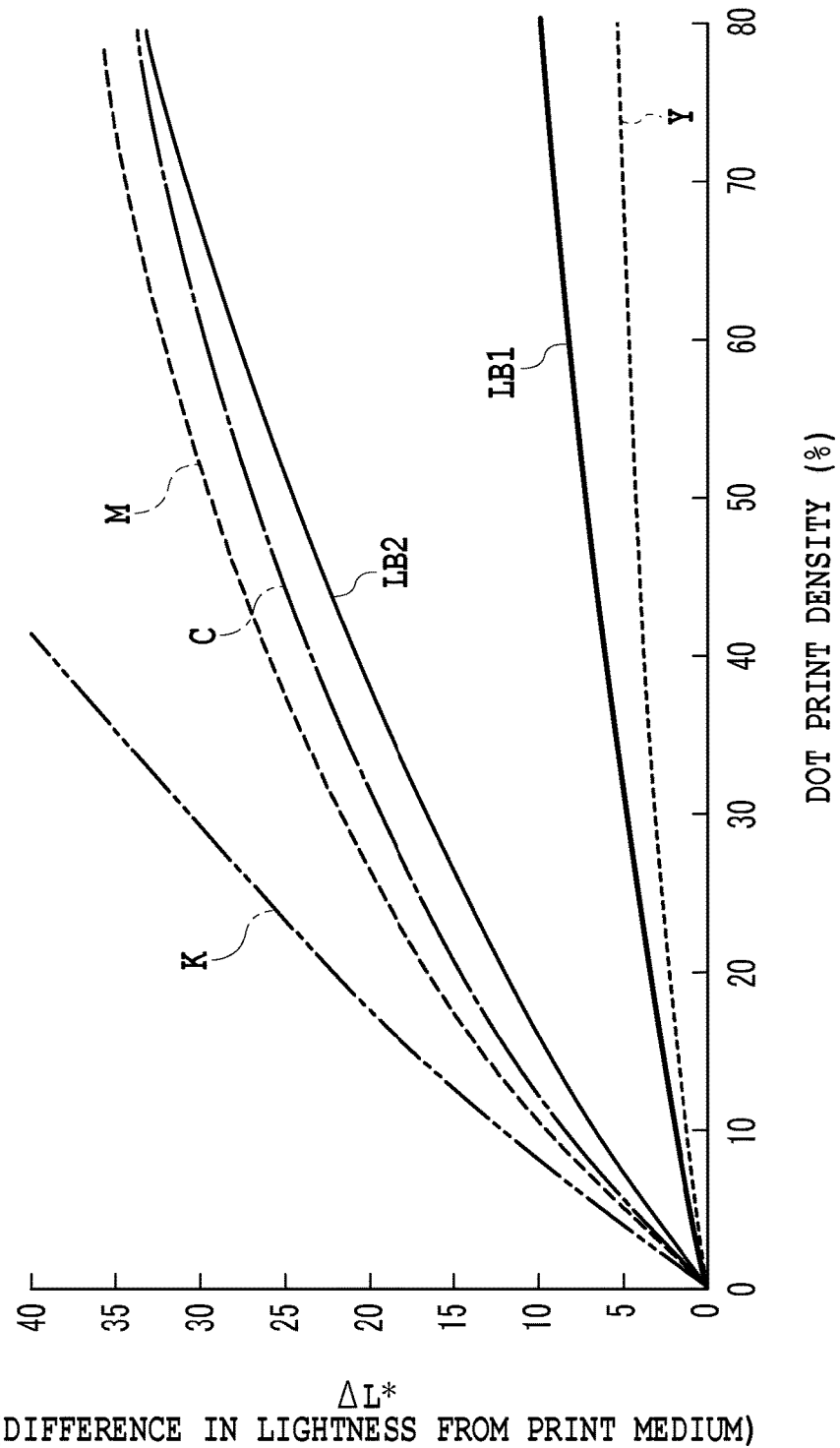

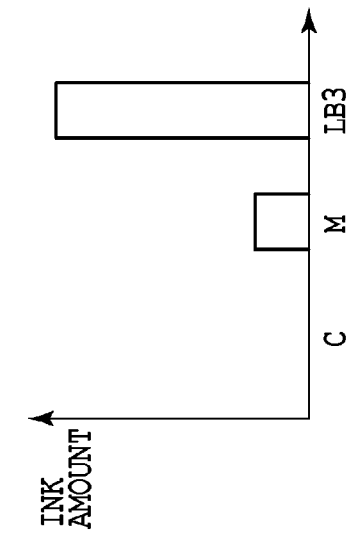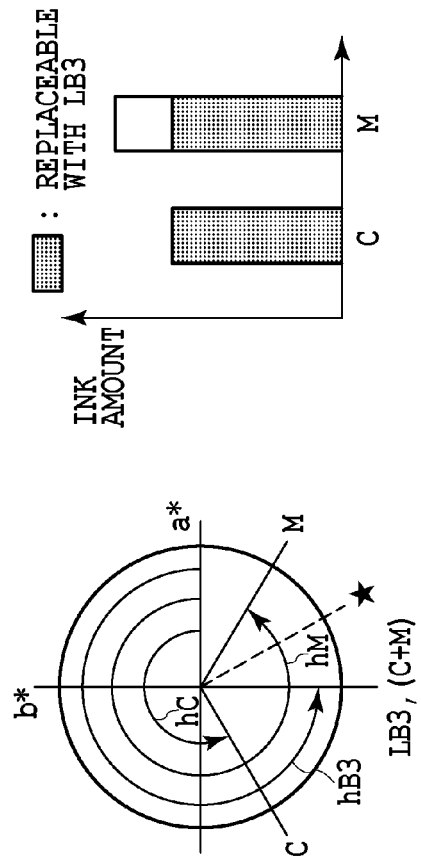
FIG.10A  FIG.10B  FIG.10C
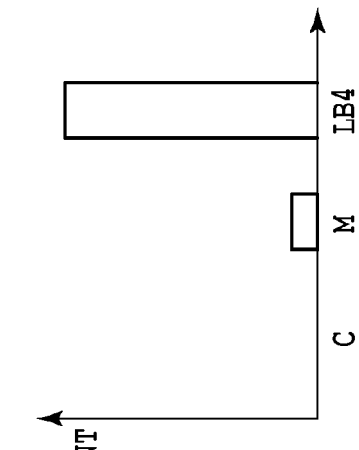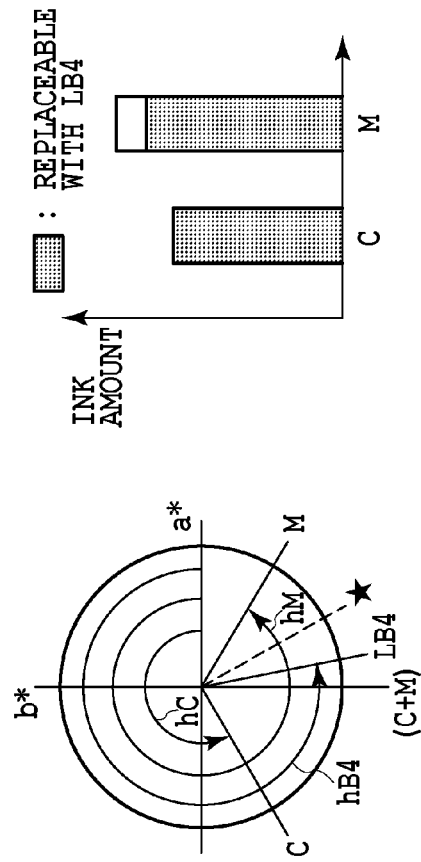
FIG.10D  FIG.10E  FIG.10F

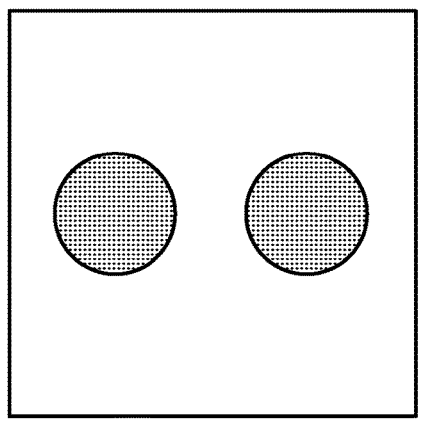
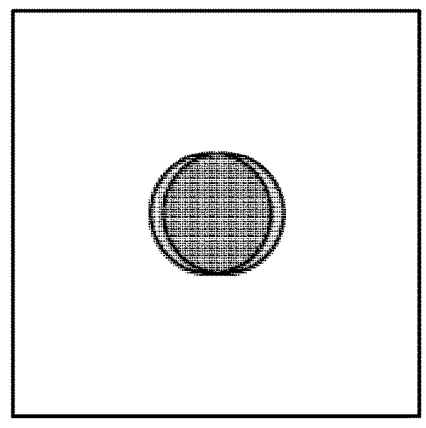
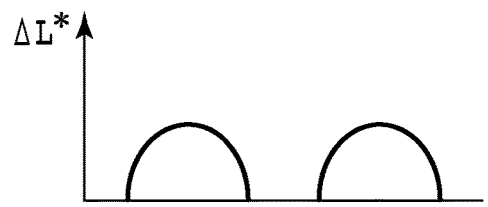
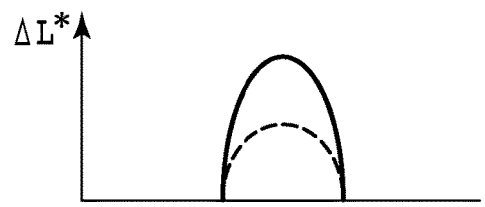
FIG.11A  FIG.11B

IMAGE PRINTING APPARATUS AND IMAGE PRINTING METHOD

BACKGROUND OF THE INVENTION

Field of the Invention

The present invention relates to an image printing apparatus using color materials and an image printing method. In particular, the present invention relates to a color material for obtaining a smooth color image with reduced graininess.

Description of the Related Art

A printing apparatus for printing an image through a subtractive process by a pseudo halftoning method uses color materials of three primary colors for printing: cyan, magenta, and yellow. By adjusting the numbers of dots of the three primary colors and a balance among the three primary colors, various densities and colors are represented on a paper surface. Further, many color printing apparatuses use a black color material in addition to the above-mentioned three primary colors to improve contrast and color stability in an achromatic color image.

In an image printing apparatus using the pseudo halftoning method, graininess has been one of the problems to be solved. Recently, graininess has been made less visible, for example, by using a print head capable of ejecting a small droplet ink to reduce the size of a dot on the paper surface or by using ink having a higher lightness than cyan and magenta, such as light cyan ink and light magenta ink. However, preparing additional ink such as light cyan and light magenta may lead to upsizing of the apparatus and an increase in running costs.

Japanese Patent Laid-Open No. 2002-154240 discloses a method for preparing light blue instead of light cyan and light magenta by taking into consideration the fact that graininess caused by overlaying cyan ink and magenta ink, in particular, tends to be a problem associated with an image. Using light blue as disclosed in Japanese Patent Laid-Open No. 2002-154240 can effectively reduce graininess in an image while limiting the types of additional color materials to one.

Japanese Patent Laid-Open No. 2002-154240 discloses setting the lightness of light blue ink higher than that of cyan ink and magenta ink, but it does not particularly explain other features. Accordingly, even if graininess in, for example, a highlight in a blue image is reduced, graininess sometimes becomes conspicuous in other areas depending on gradations and hues. In particular, in a case where there is a great difference in lightness between light blue ink and cyan ink or magenta ink, graininess may be worse in an area in which cyan dots and magenta dots or blue dots formed by overlaying the cyan dots and the magenta dots are sparsely printed in a light blue image area.

SUMMARY OF THE INVENTION

The present invention has been made to solve the above problem. An object of the present invention is to provide an image printing apparatus capable of printing an image in which graininess is suppressed in all gradations and hues while using a color material of light blue, and an image printing method.

According to a first aspect of the present invention, there is provided an image printing apparatus for printing an image on a print medium by using a plurality of color materials including at least cyan, magenta, and light blue, wherein the color material of light blue satisfies:

$\Delta L_B \geq (\Delta L_C - \Delta L_B) > 0$ and $\Delta L_B \geq (\Delta L_M - \Delta L_B) > 0$ where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $h_C + (h_{(C+M)} - h_C)/2 \leq h_B \leq h_M - (h_M - h_{(C+M)})/2$ where $h_C$ represents a hue of the image printed on the print medium with the color material of cyan, $h_M$ represents a hue of the image printed on the print medium with the color material of magenta, $h_{(C+M)}$ represents a hue of the image printed on the print medium with the color material of cyan and the color material of magenta in the same amount, and $h_B$ represents a hue of the image printed on the print medium with the color material of light blue.

According to a second aspect of the present invention, there is provided an image printing method for printing an image on a print medium by using a plurality of color materials including at least cyan, magenta, and light blue, wherein the color material of light blue satisfies:

$\Delta L_B \geq (\Delta L_C - \Delta L_B) > 0$ and $\Delta L_B \geq (\Delta L_M - \Delta L_B) > 0$ where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $h_C + (h_{(C+M)} - h_C)/2 \leq h_B \leq h_M - (h_M - h_{(C+M)})/2$ where $h_C$ represents a hue of the image printed on the print medium with the color material of cyan, $h_M$ represents a hue of the image printed on the print medium with the color material of magenta, $h_{(C+M)}$ represents a hue of the image printed on the print medium with the color material of cyan and the color material of magenta in the same amount, and $h_B$ represents a hue of the image printed on the print medium with the color material of light blue.

Further features of the present invention will become apparent from the following description of exemplary embodiments (with reference to the attached drawings).

BRIEF DESCRIPTION OF THE DRAWINGS

FIG. 6 is a diagram for explaining lightness of ink that can be used for the present invention;

FIGS. 10A to 10F are diagrams for comparing usages of two light blue inks;

FIGS. 11A and 11B are views showing a relationship between a printing state and lightness of two dots;

DESCRIPTION OF THE EMBODIMENTS

Preferable embodiments of the present invention will be described with reference to the attached drawings.

Figure 1A:
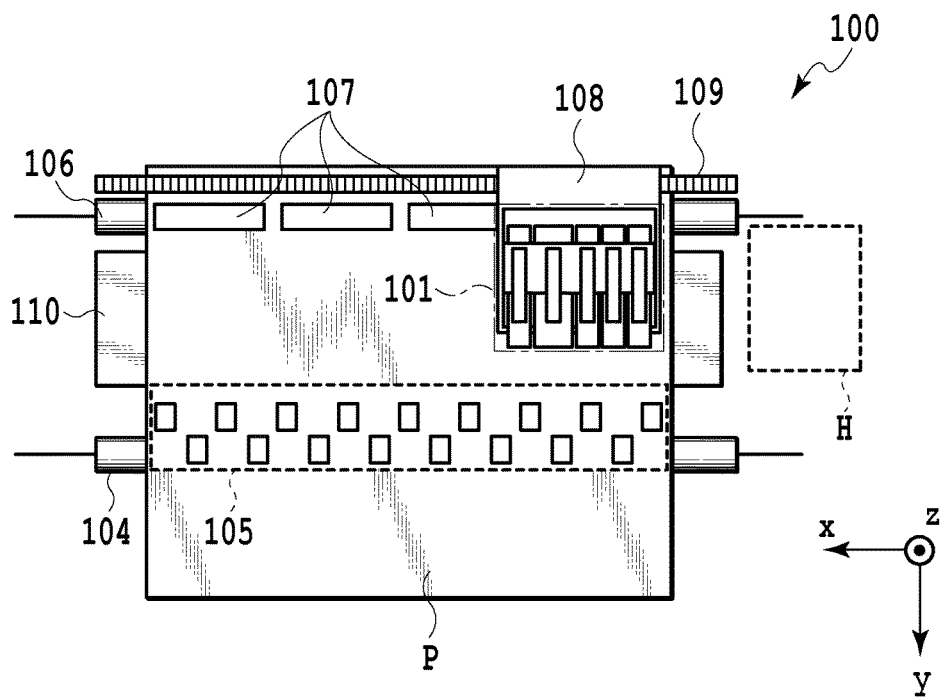
FIGS. 1A and 1B are schematic views of a configuration of an ink jet printing apparatus.
Figure 1B:
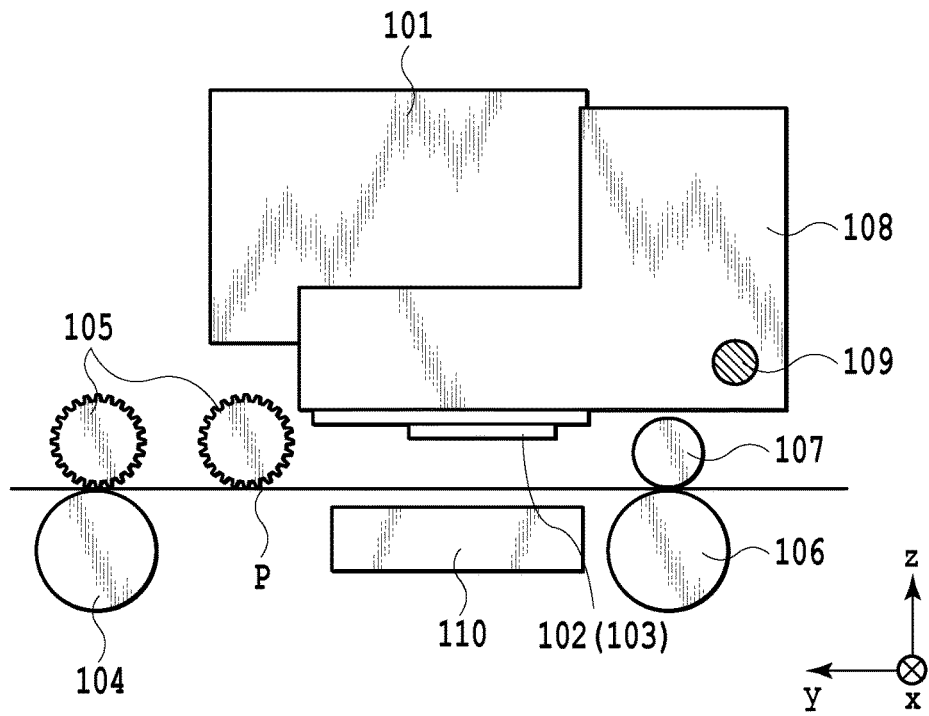

FIGS. 1A and 1B are a top view and a side cross-sectional view, respectively, for explaining a schematic configuration of an ink jet printing apparatus that can be used as an image printing apparatus of the present invention. A print medium P supplied inside the apparatus moves in Y direction along with rotation of a roller pair of a conveying roller 106 and a pinch roller 107 and a roller pair of a discharge roller 104 and a spur 105 while being sandwiched between the roller pairs. Between these two roller pairs, a carriage 108 having a print head 101 mounted thereon and capable of reciprocating in X direction is provided. The carriage 108 is guided and supported by a guide shaft 109 and prints an image on the print medium P by one line using the print head 101 that ejects ink in −Z direction according to image data while the carriage 108 moves in the X direction. Once a printing scan of one line is completed, the conveying roller 106 and the discharge roller 104 rotate and convey the print medium in the Y direction by a distance corresponding to one line. Alternately repeating such a printing scan and a conveying operation forms an image on the print medium P in stages. The print medium P in an area printed by the print head 101 is supported from its back side by a platen 110 so as to keep a print surface smooth.

The print head 101 according to the present embodiment can eject inks of five colors: cyan, magenta, yellow, black, and light blue. The carriage 108 has the print head 101 and five ink tanks for supplying inks to the print head 101. When performing maintenance processing on the print head 101, the carriage 108 moves to a home position H shown in the figure. Various mechanisms are provided in the home position H for performing suction processing, wiping processing, and preliminary ejection processing on the print head 101.

Figure 2A:
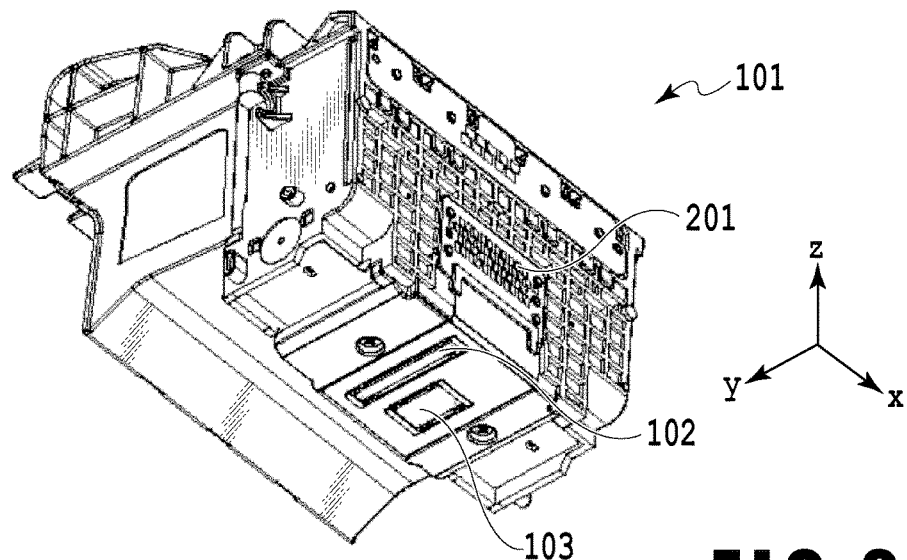
FIGS. 2A to 2C are views of a configuration of a print head.
Figure 2B:
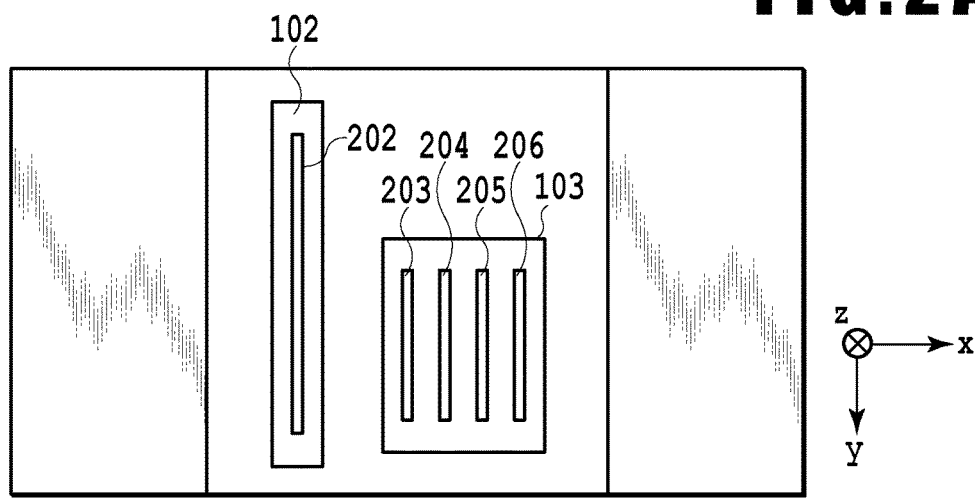
Figure 2C:
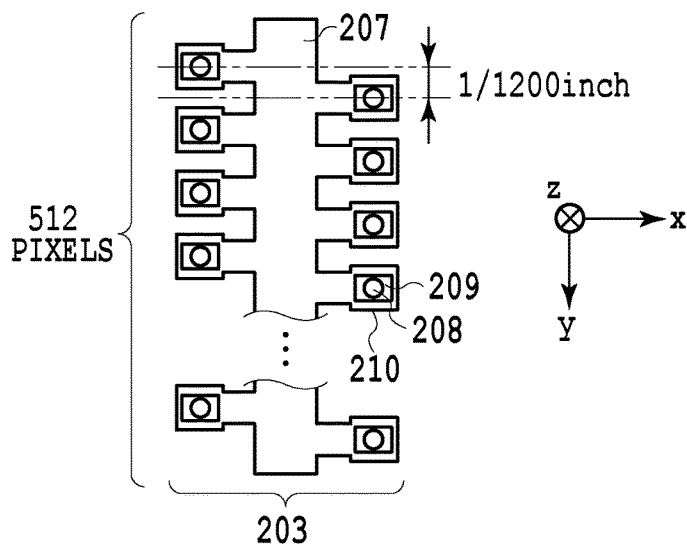

FIGS. 2A to 2C are views of a configuration of the print head 101. FIG. 2A is a perspective view of the print head. FIG. 2B shows the print head as viewed from an ejection port surface. FIG. 2C is an enlarged view of the print head. The print head 101 receives, from an image printing apparatus body, power needed for ejection and a driving signal via a contact pad 201. Print chips in which nozzles capable of ejecting ink as droplets are arranged thereon are provided for black and colors.

On a print chip 102 for black ink, nozzles that eject black ink as droplets are arranged in Y direction. Meanwhile, on a print chip 103 for color inks, a nozzle array 203 for ejecting cyan ink, a nozzle array 204 for ejecting magenta ink, a nozzle array 205 for ejecting yellow ink, and a nozzle array 206 for ejecting light blue ink are provided. These five nozzle arrays are arranged in parallel in X direction as shown in FIG. 2B. A nozzle array 202 and the print chip 102 for black ink are longer in the Y direction as compared to the nozzle arrays 203 to 206 and the print chip 103 for color inks and can perform high-speed printing in printing monochrome documents and the like.

FIG. 2C is an enlarged view of the nozzle array 203 for cyan ink. The nozzle array 203 consists of two nozzle arrays. In each nozzle array, 256 nozzles 210 are arranged in the Y direction at 1/600 inch intervals, and the two nozzle arrays are staggered by a half pitch in the Y direction. Between these two nozzle arrays, an ink liquid chamber 207 for commonly supplying ink to the nozzle arrays is provided. Each of the nozzles 210 has an ejection port 208 for ejecting ink and a heater 209 for generating ejection energy. In performing an ejection operation, a voltage is applied across the heater 209 of the corresponding nozzle 210, causing film boiling in the ink supplied from the ink liquid chamber 207. Growing energy of resulting bubbles causes the ink to be ejected as droplets from the ejection port 208. Using the nozzle array 203 can print 512 pixels having a resolution of 1200 dpi in one printing scan. It should be noted that the nozzle array 203 for cyan ink has been explained by way of example, but nozzle arrays for any ink color including black have the same configuration.

Figure 3:
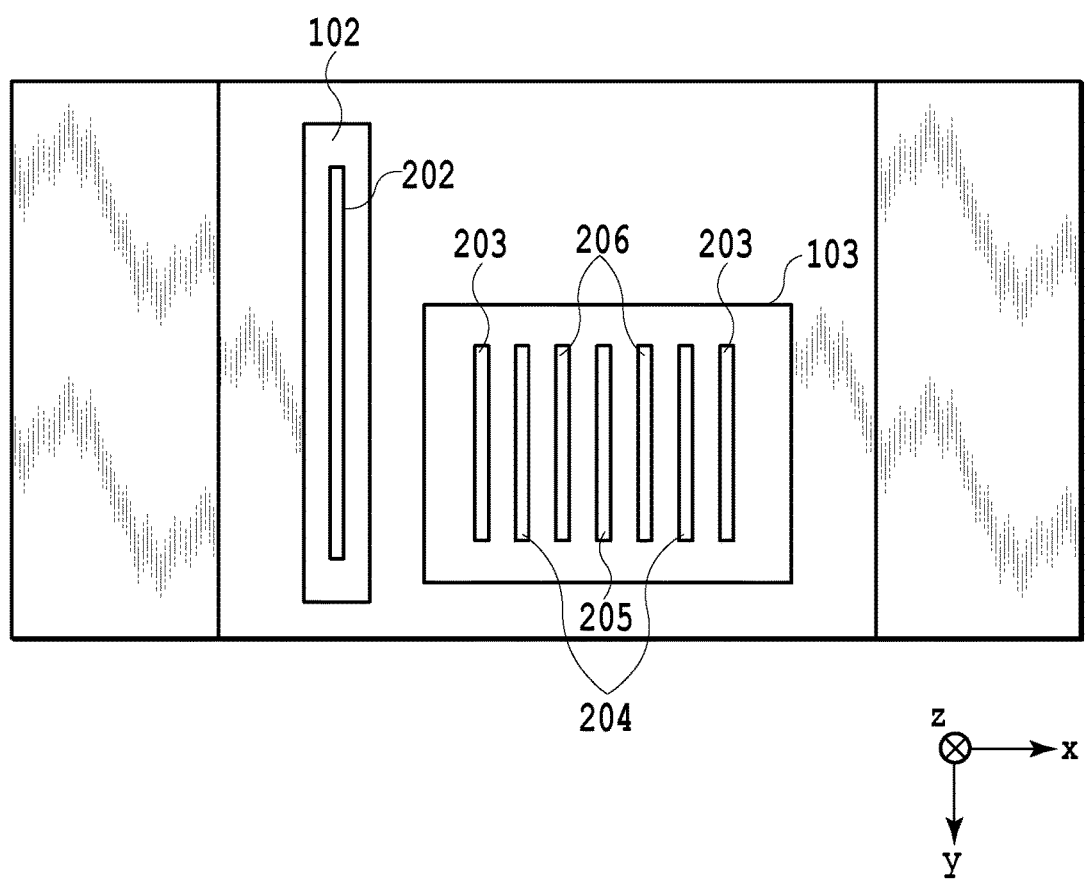
FIG. 3 is a view of another configuration of the print head.

It should be noted that the configuration of the print head applicable to the present embodiment is not limited to the one shown in FIG. 2B. Even in the case of using the same ink color, as shown in FIG. 3, for example, on the print chip 103 for color inks, two nozzle arrays 203 for cyan, two nozzle arrays 204 for magenta, and two nozzle arrays 206 for light blue may be arranged symmetrically in X direction. With the arrangement configuration as shown in FIG. 3, the order of applying ink to the print medium P is unified regardless of a scanning direction of the carriage 108, and it is possible to avoid occurrence of color bandings caused by a difference in the order of applying ink.

Figure 4:
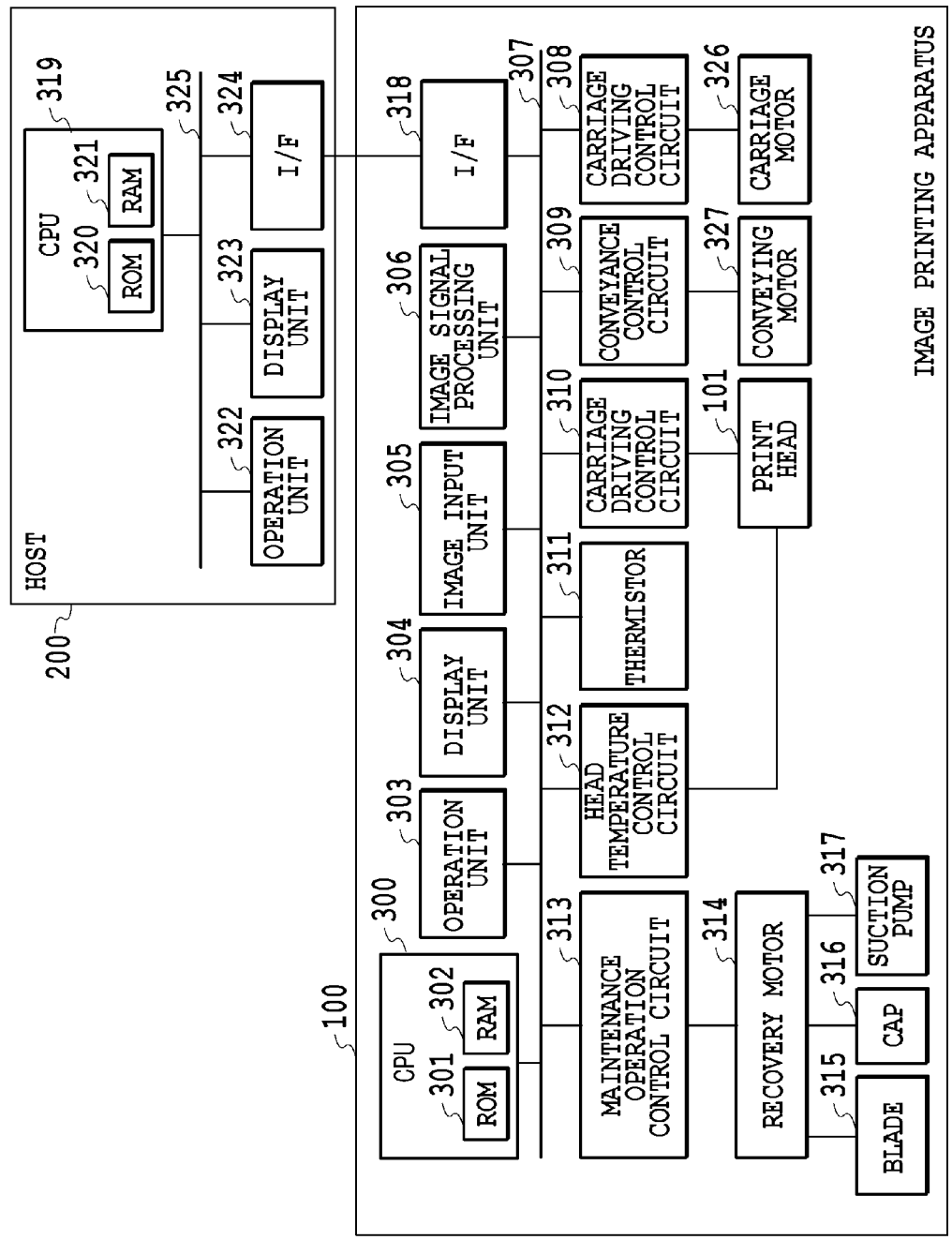
FIG. 4 is a block diagram for explaining the configuration of control relating to an image printing apparatus.

FIG. 4 is a block diagram for explaining the configuration of control relating to an image printing apparatus. A control system according to the present embodiment includes an image printing apparatus 100 and a host device 200 connected externally to the image printing apparatus 100.

In the image printing apparatus 100, constituent elements may be divided into software control units and hardware processing units. Examples of the software control units include processing units such as an image input unit 305, an image signal processing unit 306, and a central processing unit (CPU) 300 which has control over the image printing apparatus 100. The image input unit 305 is used to temporarily store an image received from the host device 200 via an interface (I/F) 318, and image data inputted to the image input unit 305 is sequentially processed by the image signal processing unit 306.

Meanwhile, examples of the hardware processing units include processing units such as an operation unit 303, a display unit 304, a maintenance operation control circuit 313, a head temperature control circuit 312, a head driving control circuit 310, a carriage driving control circuit 308, and a conveyance control circuit 309. The operation unit 303 receives a command from a user and the display unit 304 displays information provided to the user. The maintenance operation control circuit 313 operates a blade 315, a cap 316, and a suction pump 317 by using a recovery motor 314 so as to perform various kinds of maintenance processing on the print head 101 which has moved to the home position H. The head driving control circuit 310 drives the print head 101 according to a print signal generated by the image signal processing unit 306 and a detection result of a thermistor 311. The head temperature control circuit 312 adjusts a temperature of the print head 101 based on the detection result of the thermistor 311. The carriage driving control circuit 308 drives a carriage motor 326 for a reciprocation scanning of the carriage 108 in the X direction. The conveyance control circuit 309 drives a conveying motor 327 to rotate the conveying roller 106 and the discharge roller 104 and conveys the print medium P in the Y direction. The above mechanisms are connected to each other via a bus line 307 and controlled by the CPU 300.

The CPU 300 has a ROM 301 and a RAM 302. While using the RAM 302 as a work area, the CPU 300 generally controls the image printing apparatus 100 according to programs and various parameters stored in the ROM 301. For example, upon receiving a print command, the CPU 300 sets a driving pulse to be applied to the heater of the print head 101 according to a table stored in advance in the ROM 301 and provides the driving pulse to the head driving control circuit 310. Further, based on a print mode set by the user, the CPU 300 reads a corresponding driving condition of the carriage 108 and a corresponding conveying condition of the print medium from the table stored in advance in the ROM 301, and provides them to the carriage driving control circuit 308 and the conveyance control circuit 309. The ROM 301 stores also a timing chart program for performing maintenance processing on the print head. The CPU 300 controls the maintenance operation control circuit 313 and the print head 101 according to the timing chart program and appropriately performs a preliminary ejection operation and a suction recovery operation.

The host device 200 connected externally to the image printing apparatus 100 may be a mobile phone, a smartphone, a tablet, a digital camera, other portable/stationary terminals, and the like as well as a common PC. An internal configuration of the host device 200 changes depending on a main purpose of the apparatus, but generally includes a CPU 319, an operation unit 322, a display unit 323, and an interface I/F 324. These mechanisms are electrically connected to each other via a bus line 325. A keyboard and a mouse, for example, can be applied to the operation unit 322. An LCD, for example, can be applied to the display unit 323.

Figure 5:
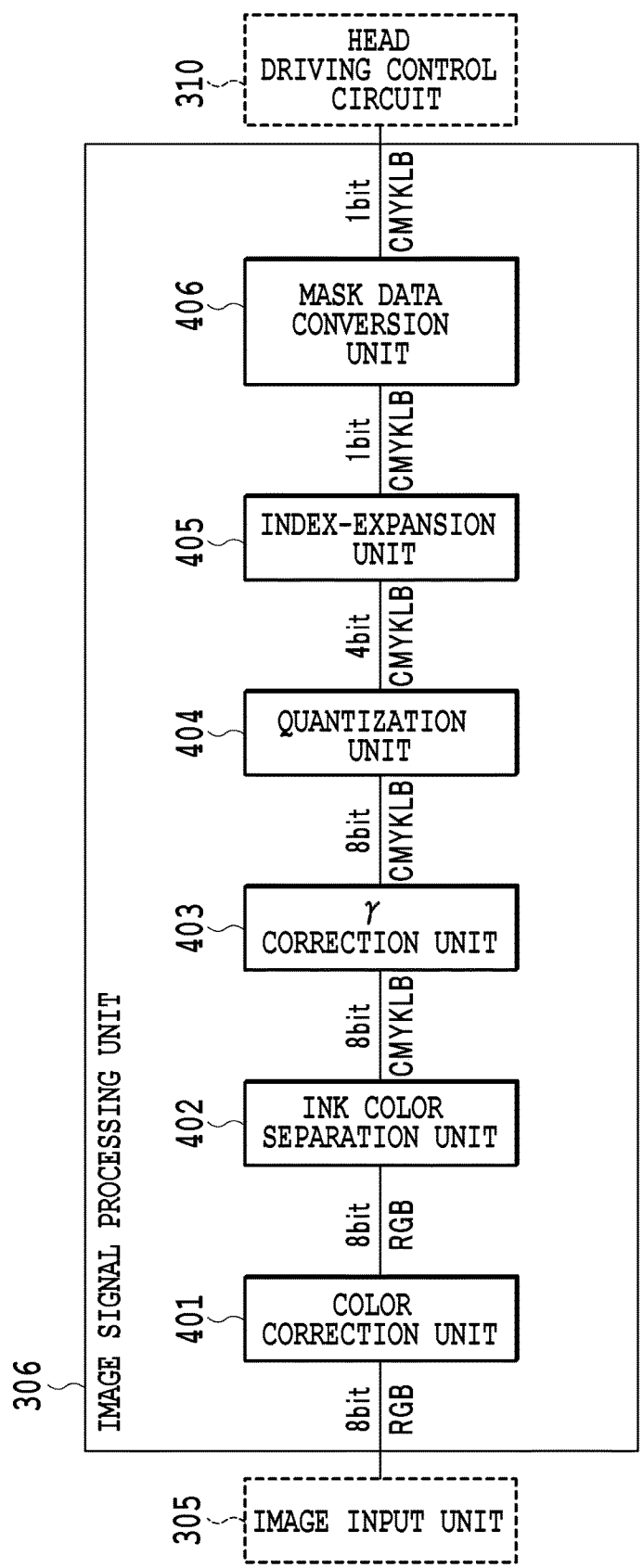
FIG. 5 is a block diagram for explaining the processing configuration in an image signal processing unit.

FIG. 5 is a block diagram for explaining the processing configuration in the image signal processing unit 306. The image signal processing unit 306 receives image data pixel by pixel from the image input unit 305 and performs the following processing. In the present embodiment, the image data received from the image input unit 305 has a resolution of 600 dpi and includes RGB signals of 8 bits per color having 256 gradations per pixel. Such an image signal is first sent to a color correction unit 401 and subjected to processing for associating a color space such as sRGB represented in the host device 200 with a color space that can be represented in the printing apparatus 100. More specifically, with reference to a three-dimensional lookup table stored in advance in the ROM 301, an 8-bit RGB signal is converted into another 8-bit RGB signal.

Next, an ink color separation processing unit converts an RGB luminance signal generated in the color correction unit 401 into a density signal corresponding to an ink color used in the printing apparatus 100. More specifically, with reference to the three-dimensional lookup table stored in advance in the ROM 301, an 8-bit RGB signal is converted into an 8-bit density signal of black (K), cyan (C), magenta (M), yellow (Y), and light blue (LB).

The 8-bit density signal after separation into an ink color is inputted to a γ correction unit 403, and a density value is corrected for each ink color. The γ correction is performed so that the inputted density signal and an optical density represented on the print medium have a linear relationship. More specifically, with reference to a one-dimensional lookup table stored in advance in the ROM 301, 8-bit density data for each ink color is converted into other 8-bit density data.

After that, the 8-bit density data corresponding to each ink color is subjected to quantization processing in a quantization unit 404. In the present embodiment, a method for quantization processing is not particularly limited, and a dither method, an error diffusion method, and the like may be employed. Furthermore, a signal value after the quantization may be binary or multi-valued.

In a case where data after the quantization is multi-valued, the quantized data is sent to an index-expansion unit 405 and converted into a binary signal in the index-expansion unit 405. More specifically, an index pattern in which printing (1) or non-printing (0) of a dot is defined for each print pixel is read and outputted for each 600 dpi input pixel. The index pattern will be described later in detail.

Then, the binary data is sent to a mask data conversion unit 406. The mask data conversion unit 406 determines in which printing scan a dot determined to be printed in index-expansion processing is to be printed in multi-pass printing of the printing apparatus. More specifically, a mask pattern in which allowance (1) or non-allowance (0) of the printing of a dot corresponding to each printing scan in the multi-pass printing is defined is ANDed with the binary signal outputted from the index-expansion unit 405, and dot print data is distributed to each printing scan. In a case where the multi-pass printing is 1-pass printing, processing by the mask data conversion unit 406 is omitted.

The binary signal outputted from the mask data conversion unit 406 is sent to the head driving control circuit 310, and the head driving control circuit 310 causes the print head 101 to perform the ejection operation according to the binary signal.

Incidentally, not all the series of processing described above with reference to FIG. 5 need to be performed in the image signal processing unit 306 of the printing apparatus 100. For example, in a case where an image created by an application is printed, a printer driver installed in the host device 200 performs the processing including the quantization processing and transfers the quantized data to the printing apparatus 100, and the image signal processing unit 306 may perform the processing after the quantization processing. In addition, the number of bits of a signal and type of signal handled in each processing unit are not limited to the above-described example. To improve a precision of a gradation, it is also possible to set the number of output bits greater than the number of input bits.

Here, a detailed description will be given of an index pattern suitable for the present embodiment used in the index-expansion unit 405. FIGS. 11A and 11B are views for explaining a relationship between a printing state and lightness of two dots. FIG. 11A shows a state in which two dots of the same color are printed without overlapping and a difference in lightness $\Delta L^*$ between the two dots and the print medium. FIG. 11B shows a state in which two dots are printed while overlapping each other and a difference in lightness $\Delta L^*$ between the overlapping dots and the print medium. It is forecasted that the difference in lightness ΔL* between the overlapping dots and the print medium is greater and graininess is more conspicuous. Accordingly, in the present embodiment, to suppress graininess, overlaps of a plurality of dots are minimized as shown in FIG. 11A.

Figure 12:
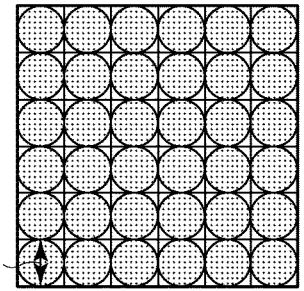
FIG. 12 is a diagram showing a print resolution and a dot layout on a print medium.

FIG. 12 is a diagram showing a print resolution and a dot layout on a print medium. In a case where a print resolution is isotropic, the index-expansion unit 405 performs the index-expand processing with respect to an input pixel to generate print pixels composing the same number of pixels in width and length. Each print pixel is a square. To avoid overlaps of neighboring dots and to fit a dot into each pixel, a diameter R of the dot is equal to a length S of the side of each pixel (R=S). In this state, however, a blank area is exposed even if dots are printed in all the pixels. To avoid the blank area when dots are printed in all the pixels, neighboring dots need to overlap each other to some extent. To minimize the overlaps, the diameter R of the dot is equal to a length S√2 of a diagonal line of each pixel (R=S√2). That is, to minimize a difference in lightness without making graininess detected, the dot diameter R preferably satisfies the following expression:

$S \leq R \leq S\sqrt{2}$.

Meanwhile, in a case where a print resolution is anisotropic, each print pixel is a rectangle. FIG. 12 shows an example of the state in which a resolution in a vertical direction is twice a resolution in a horizontal direction, that is, a height of the print pixel is half a width of the print pixel. In this state, if overlaps of the neighboring dots are avoided as much as possible, a diameter R of the dot is equal to a length T of the long side of each pixel (R=T). In this state, however, a blank area is exposed even if dots are printed in all the pixels. By allowing the minimum overlaps of the neighboring dots so as to avoid the blank area when dots are printed in all the pixels, the diameter R of the dot is equal to a length (T√5)/2 of a diagonal line of each pixel (R=(T√5)/2). That is, to minimize a difference in lightness without making graininess detected, the dot diameter R preferably satisfies the following expression:

$T \leq R \leq (T\sqrt{5})/2$.

In addition, the dot layout according to an increase in the gradation level also affects not only lightness but also graininess of an image. That is, if a plurality of dots are continuously arranged in a short side direction as shown in the right column of the figure from the stage of a low gradation level, an overlapping area may be large irrespective of the remaining blank area, and graininess may become conspicuous. Accordingly, as shown in the center column of the figure, the layout is preferable in which dots are arranged in print pixels in a dispersed manner as much as possible in the short side direction.

FIGS. 13A to 13D are diagrams showing an example of an index pattern satisfying such a condition. In this example, a case of performing the index-expansion processing with respect to a 600 dpi input pixel into a 2×1 print pixel of 1200 dpi (height)×600 dpi (width) is shown. In a case where input data is at level 0, a dot is printed in none of the 2×1 print pixels. In a case where input data is at level 2, a dot is printed in every print pixel.

Figure 13A:
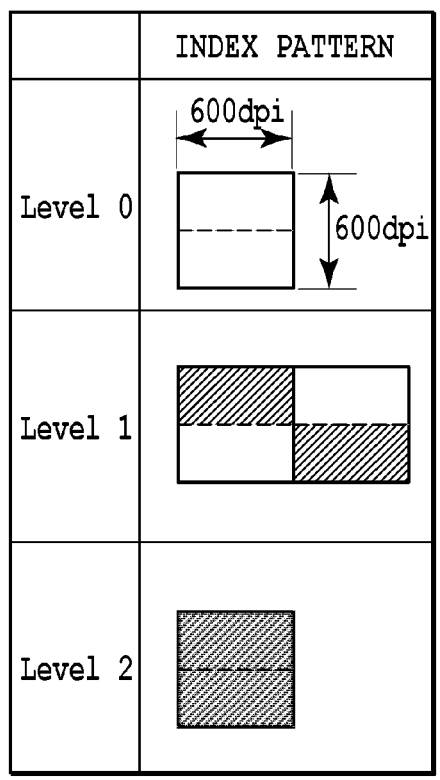
FIGS. 13A to 13D are diagrams showing an example of an index pattern.
Figure 13B:
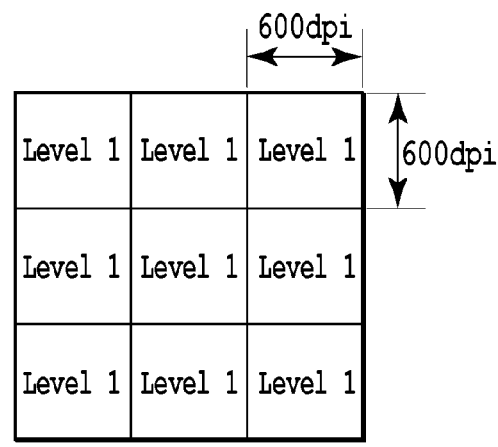
Figure 13C:
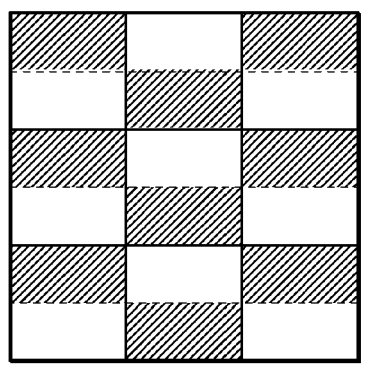
Figure 13D:
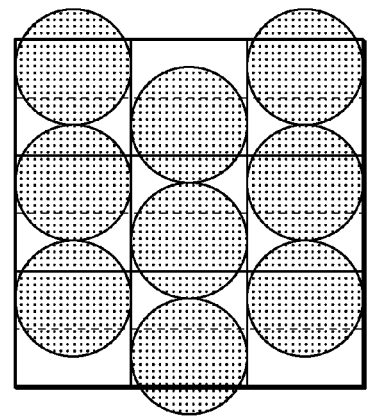

In a case where a plurality of pixels of input data at level 1 continue as shown in FIG. 13B, on a condition that the index pattern is at level 1 as shown in FIG. 13A, the index pattern on the paper surface is shown in FIG. 13C, and the dot layout is shown in FIG. 13D. That is, in a halftone area having about a 50% print density, overlaps of dots can be effectively avoided, and a decrease in lightness caused by the overlaps of dots can be minimized.

It should be noted that in the above example, by making the index pattern characteristic, the overlaps of dots are minimized in a density from a highlight to a halftone. However, also in a case where, for example, binarization is performed in the quantization unit 404 without providing an index-expansion unit 405, employing a quantization processing method to increase dispersibility among dots in the density from a highlight to a halftone can suppress the overlaps of dots and make graininess less conspicuous.

(Characteristic Configuration)

A description will be given of a feature of color inks used as color materials in the present embodiment. FIG. 6 is a diagram for explaining lightness of ink used in the present embodiment. A horizontal axis shows a print density of ink dots on a predetermined print medium. A vertical axis shows a difference in lightness ΔL* between an area in which dots are printed in the corresponding print density and a blank area in the print medium. Black ink (K) has a greatest difference in lightness, then, magenta ink (M), cyan ink (C), light blue ink (LB), and yellow ink (Y) in decreasing order. Differences in lightness of the ink colors will be hereinafter referred to as $\Delta L_K$, $\Delta L_C$, $\Delta L_M$, $\Delta L_Y$, and $\Delta L_B$. Traditionally, a color material density of the light blue ink has been sufficiently low as compared to the cyan ink and the magenta ink to reduce graininess in a highlight as much as possible and has been adjusted so that a difference in lightness between the light blue ink and the blank area is about $\Delta L_{B1}$ as shown in the figure. Recently, however, the size of a droplet has become smaller as the improvement of a print resolution, and even with ink having a certain density, a dot itself has become less conspicuous. Accordingly, it is possible to increase a density of a dye (or a pigment) of the light blue ink to an extent that graininess in a highlight is not conspicuous, and in the present embodiment, a color material density of the light blue ink is adjusted so as to obtain a difference in lightness of about $\Delta L_{B2}$ as shown in the figure.

More specifically, a light blue ink (LB2) according to the present embodiment is prepared such that a difference in lightness $\Delta L_{B2}$ satisfies the following condition 1.

$\Delta L_B \geq (\Delta L_C - \Delta L_B) > 0$ and $\Delta L_B \geq (\Delta L_M - \Delta L_B) > 0$ (condition 1)

The light blue ink as prepared under the condition 1 has a lightness that is higher than that of the cyan ink and the magenta ink, a dye density that is higher than that of a conventional light blue ink LB1, and a great difference in lightness $\Delta L_B$ between the light blue ink and the blank area.

Figure 7A:
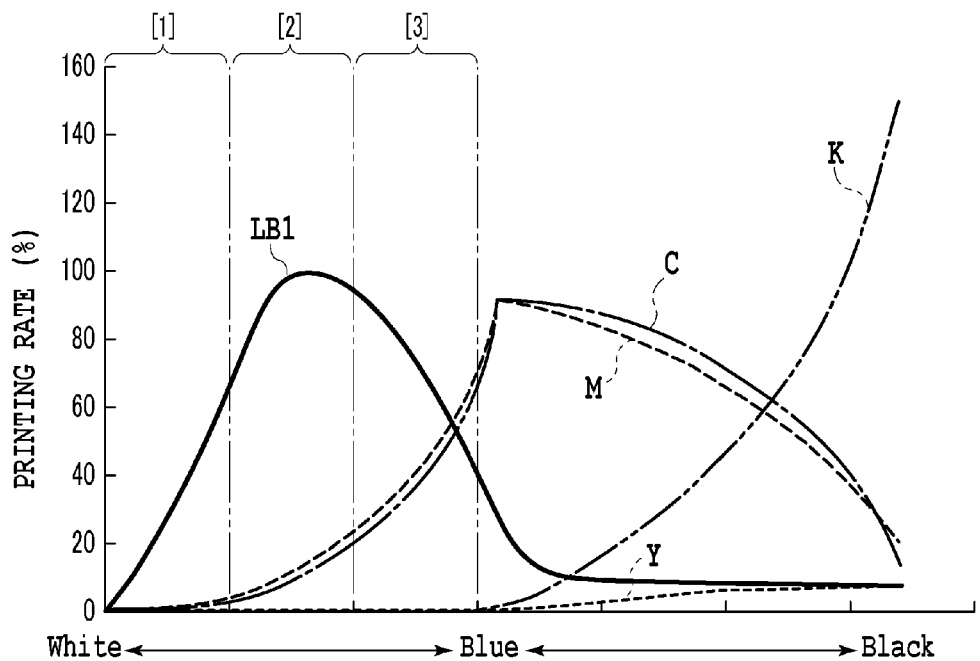
FIGS. 7A and 7B are diagrams for comparing usages of two light blue inks.
Figure 7B:
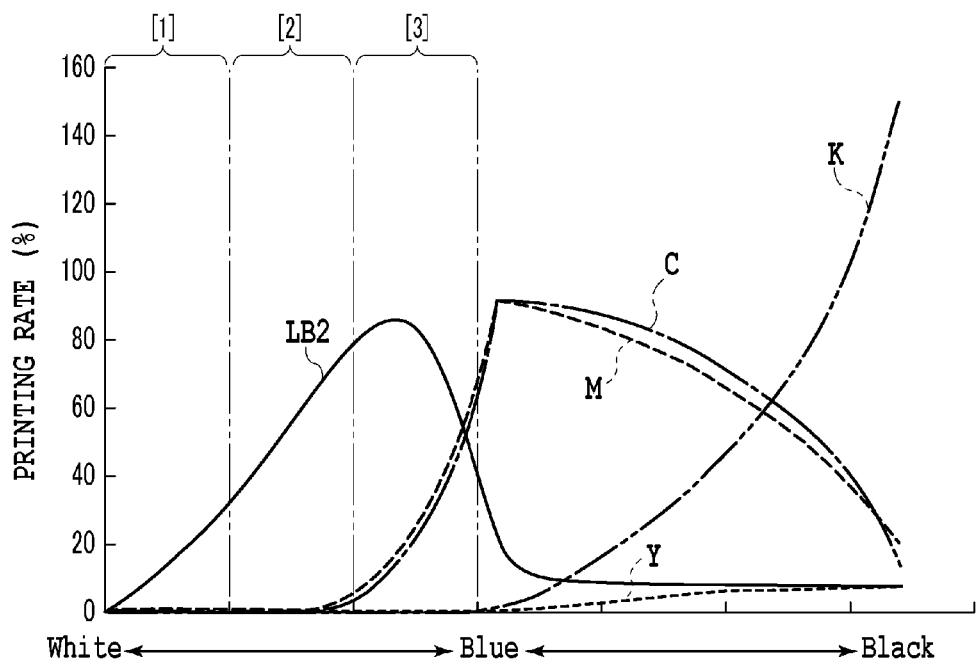

FIGS. 7A and 7B are diagrams for comparing usages of the above-mentioned light blue inks LB1 and LB2. Here, FIGS. 7A and 7B show a printing rate of each ink color used to represent each tone color in a gradation area from white to black through blue. In a case where LB1 having a small difference in lightness from the blank area is used, as can be seen in FIG. 7A, a large amount of LB1 is used in an area [1] which is close to white. The largest amount of LB1 is used in an area [2] and the amount gradually decreases in an area [3]. The cyan ink (C) and the magenta ink (M) start to be gradually added in the area [1] to represent a deeper blue image that cannot be represented with LB1, and the amount of cyan ink (C) and the amount of magenta ink (M) further increase in the area [2] and the area [3].

Meanwhile, in a case where LB2 having a great difference in lightness from the blank area is used, as can be seen in FIG. 7B, an inclination in the area [1] which is close to white is smaller as compared to the case of LB1, and the largest amount of LB2 is used in the area [3]. The cyan ink (C) and the magenta ink (M) are hardly used in the area [1]. They start to be gradually added in the area [2], and the amount of cyan ink (C) and the amount of magenta ink (M) further increase in the area [3].

Figure 8:
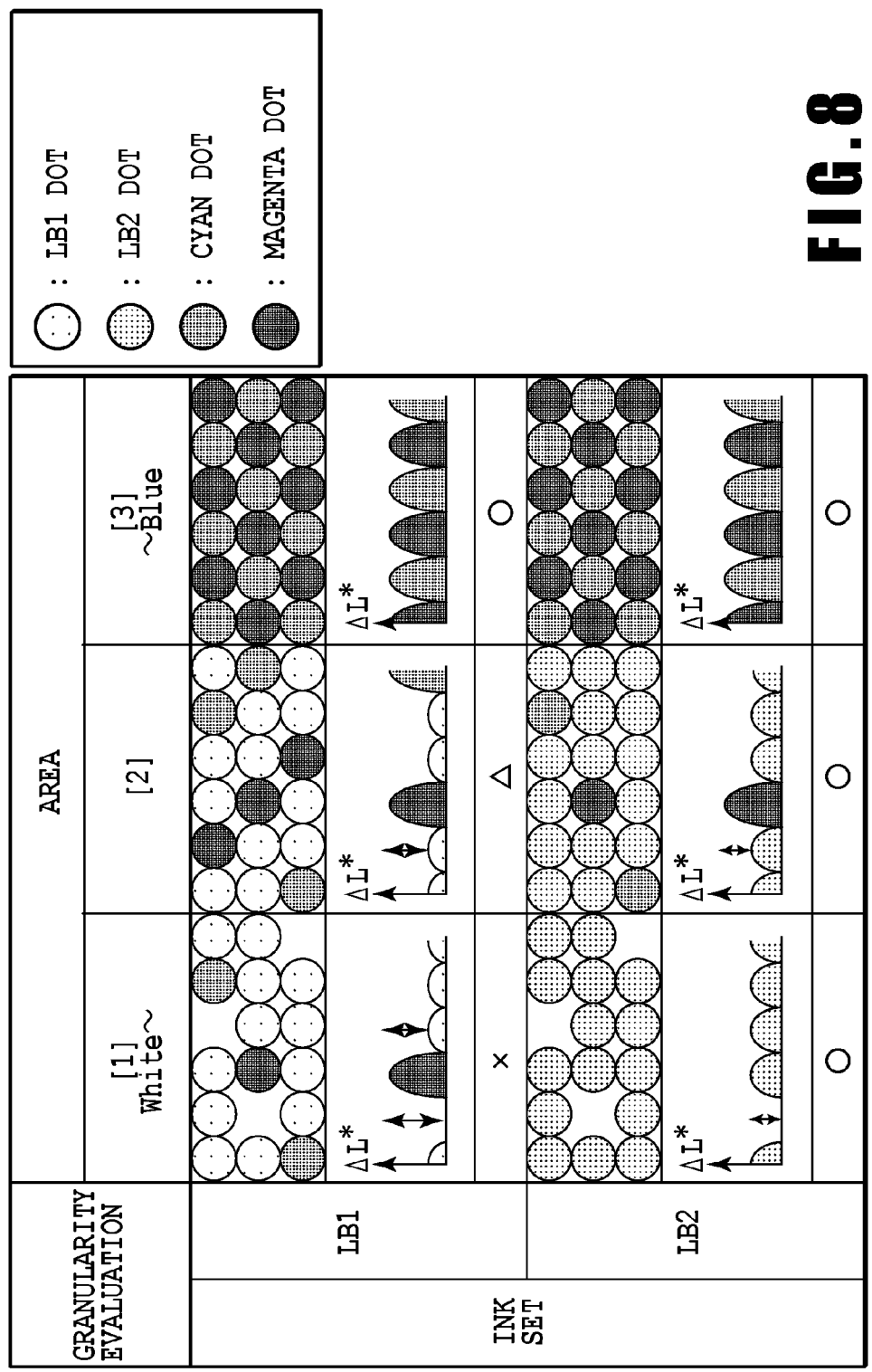
FIG. 8 is a diagram for comparing a printing state of dots and a graininess evaluation.

FIG. 8 is a diagram for comparing printing states of dots in the area [1], the area [2], and the area [3] as shown in FIGS. 7A and 7B and graininess evaluations. In a case where LB1 is used, in the area [1] in a state in which the paper surface is not filled with LB1 dots, cyan dots and magenta dots are printed. As a result, the cyan dots and the magenta dots become conspicuous, making graininess worse (×). In the area [2], the paper surface is filled with LB1 dots, cyan dots, and magenta dots. However, since the cyan dots and the magenta dots have lightness that is sufficiently lower than that of the LB1 dots, graininess is detected to some extent (Δ).

Meanwhile, in a case where LB2 is used, cyan dots and magenta dots are not printed in the area [1], and only LB2 dots represent a predetermined gradation. Accordingly, graininess is low and a uniform image can be obtained (○). In the area [2], LB2 dots, cyan dots, and magenta dots are mixed. However, since the LB2 dots have lightness that is not as high as that of the cyan dots and magenta dots, graininess is less likely to be detected (○). Incidentally, in the area [3], since most part of the area is filled with cyan dots and magenta dots, whether LB1 is used or LB2 is used, graininess is not detected (○).

Figure 9A:
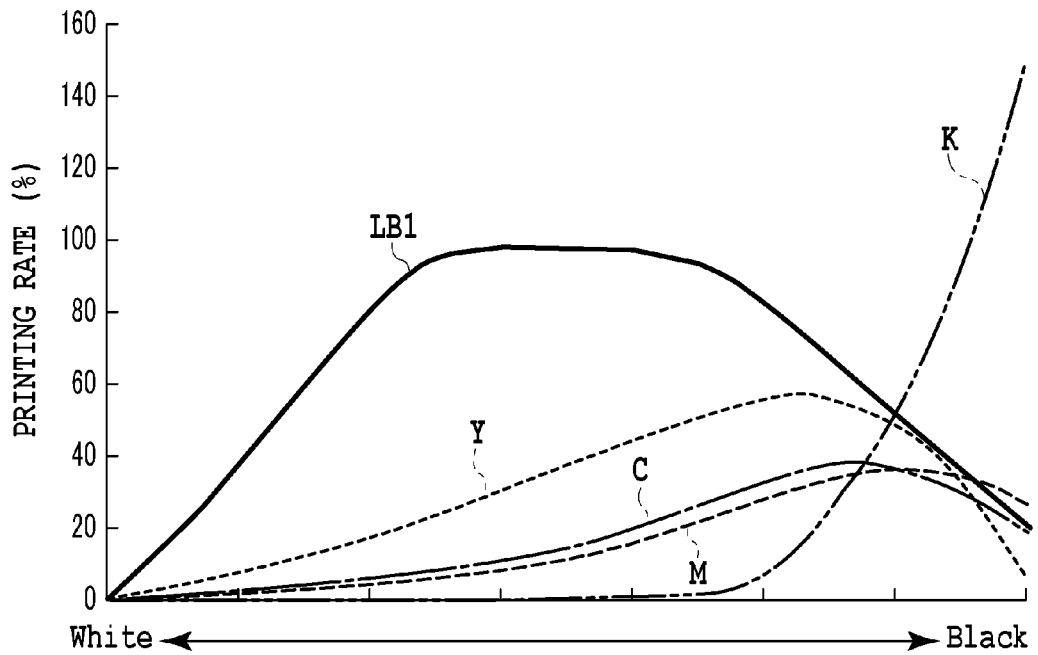
FIGS. 9A and 9B are diagrams for comparing usages of two light blue inks.
Figure 9B:
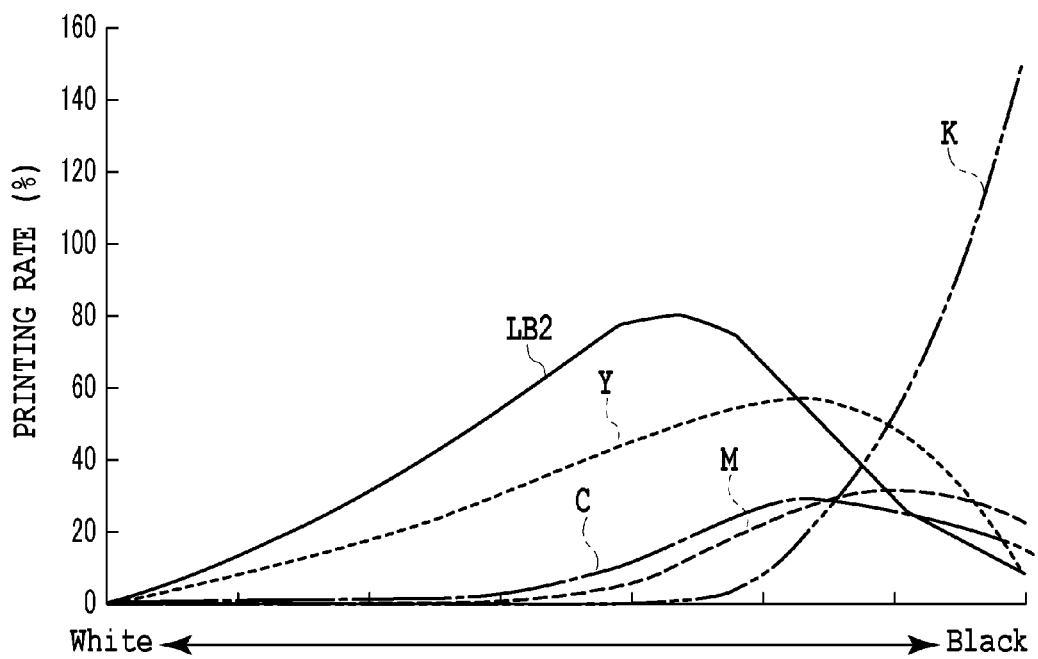

Meanwhile, FIGS. 9A and 9B are diagrams for comparing a printing rate of each ink color used to represent each tone color in a gray gradation area from white to black between the case of using LB1 as light blue ink and the case of using LB2 as light blue ink. In the case of using LB1, as can be seen in FIG. 9A, a large amount of LB1 is used in an area close to white, and cyan ink (C) and magenta ink (M) are added from a low-gradation area. Accordingly, cyan dots and magenta dots become conspicuous, and graininess is likely to be worse.

Meanwhile, in the case of using LB2, as can be seen in FIG. 9B, an inclination in the area close to white is smaller as compared to the case of using LB1. The cyan ink (C) and the magenta ink (M) are hardly used in the low-gradation area. They start to be gradually added in a halftone area which is filled with blue dots. Accordingly, graininess is low and a uniform image can be obtained in the low-gradation to halftone area. As described above, using blue ink that satisfies the above condition 1 can produce its effect in the gradation areas of not only a blue hue but also all hues that require both cyan and magenta.

By the way, a description has been given on an assumption that the light blue ink has a hue that is just at the midpoint between the hues of the cyan ink and the magenta ink. However, the light blue ink for obtaining the above effect is not limited to this. According to the study of the inventors of the present invention, with respect to light blue ink LB, it is confirmed that the above-described effect of a decrease in graininess can be obtained as long as its hue angle $h_B$, on an a*b* plane, satisfies the following condition 2.

$$h_C+(h_{(C+M)}-h_C)/2 \leq h_B \leq h_M-(h_M-h_{(C+M)})/2 \quad \text{(condition 2)}$$

Here, $h_C$ is a hue angle of cyan ink, $h_M$ is a hue angle of magenta ink, and $h_{(C+M)}$ is a hue angle obtained in the case of printing cyan ink and magenta ink in the same amount.

For example, if $h_C=210°$, $h_M=330°$, and $h_{(C+M)}=270°$, the condition 2 is $240° \leq h_B \leq 300°$. $h_{(C+M)}$ is not always an average of $h_C$ and $h_M$, and for example if $h_{(C+M)}=280°$, the condition 2 is $245° \leq h_B \leq 305°$.

An example of color material components and color material densities of cyan ink, magenta ink, and light blue ink satisfying the above conditions 1 and 2 is shown below.

Cyan ink: DBL199 3%
Magenta ink: AR249 3%
Light blue ink: DBL199 0.75% and AR249 0.75%

Each ink includes the following solvent: 10% of ethylene glycol, 10% of diethylene glycol, 1% of acetylenol E100, and pure water.

Preparing ink with the above components can satisfy both of the condition 1 and the condition 2, allowing output of an image having reduced graininess in all gradations and hues as compared to the conventional one.

It should be noted that in the above example, with respect to light blue ink, by taking into consideration continuity of hues in the case of applying cyan ink and magenta ink as well as light blue ink to a print medium, color material components used for the cyan ink and the magenta ink are mixed. However, such a mode does not limit the present embodiment. The light blue ink may contain a color material component that is different from those of the cyan ink and the magenta ink. In this example, a dye ink is used which includes a dye component as a color material, but a pigment ink including a pigment component may be used. In either case, as long as color materials of cyan, magenta, and light blue in a combination of satisfying the above conditions 1 and 2 are prepared, it is possible to produce an effect of a decrease in graininess.

Modification Example

As a modification example, a description will be given of a case where, while satisfying the above condition 2, a hue of light blue ink is shifted on purpose from an intermediate value between cyan ink and magenta ink. In the case of representing hues of blue and gray as shown in FIG. 8 and FIGS. 9A and 9B, cyan ink and magenta ink are used in substantially the same amount, but in most of other hues, even if both of the cyan ink and the magenta ink are used, their use frequencies are unbalanced. Then, for example, with blue closer to cyan, the number of cyan dots printed alone increases, while with blue closer to magenta, the number of magenta dots printed alone increases. At this time, referring back to FIG. 6, in comparison of cyan ink and magenta ink, a difference in lightness between magenta ink and a print medium tends to be greater than a difference in lightness between cyan ink and a print medium ($\Delta L_M > \Delta L_C$), and graininess tends to become conspicuous in the magenta ink. Accordingly, in the present modification example, the hue of light blue ink is adjusted so as to minimize a use frequency of magenta dots alone.

FIGS. 10A to 10F are diagrams for comparing usages of two light blue inks LB3 and LB4 having different hues. FIGS. 10A and 10D respectively show hue angles of light blue inks LB3 and LB4 on an a*b* plane. With reference to FIG. 10A, the light blue ink LB3 has a hue angle ($h_{B3}$) that is just at the midpoint between a hue angle ($h_C$) of cyan ink and a hue angle ($h_M$) of magenta ink. Meanwhile, with reference to FIG. 10D, the light blue ink LB4 has a hue angle ($h_{B4}$) that is inclined toward magenta relative to the just midpoint between the hue angle ($h_C$) of cyan ink and the hue angle ($h_M$) of magenta ink.

Here, a description will be given of a case where a hue indicated by a star, which is a little closer to magenta than pure blue, is represented on the paper surface. In the case of using only cyan ink and magenta ink, the usage of magenta ink is greater than the usage of cyan ink as shown in the bar graphs of FIGS. 10B and 10E. However, in a case where the same color is represented by further adding light blue ink, a shaded area can be replaced with light blue ink, and the amount of light blue ink LB3 and the amount of light blue ink LB4 differ as shown in FIGS. 10B and 10E, respectively.

In the case of using the light blue ink LB3 having a hue angle that is just at the midpoint between the hues of cyan ink and magenta ink, as shown in FIG. 10B, both cyan ink and magenta ink can be replaced with light blue ink in an amount corresponding to the usage of cyan ink. As a result, as shown in FIG. 10C, the usage of cyan ink is 0, and the usage of magenta ink is a remaining amount that cannot be replaced with the light blue ink LB3.

Meanwhile, in the case of using the light blue ink LB4, since a hue of the light blue ink LB4 is a little inclined toward magenta, as shown in FIG. 10E, a much greater amount of magenta ink can be replaced with the light blue ink LB4. As a result, as shown in FIG. 10F, the usage of cyan ink is 0, and the usage of magenta ink can be further decreased to a small amount as compared to the case shown in FIG. 10C. Thus, graininess of magenta ink alone can be further reduced.

It should be noted that in the above description, an example is given of the case where a hue to be represented is inclined toward magenta. Accordingly, an effect of LB4 having a hue inclined toward magenta is produced, and graininess of magenta ink is suppressed. However, in a case where the same ink is used to represent a color inclined toward cyan, a use frequency of cyan ink alone rather increases. However, as already described, in view of the fact that graininess of magenta ink is visually more conspicuous than graininess of cyan ink, the object of the present modification example is to suppress the use frequency of magenta dots alone as compared to the use frequency of cyan dots alone. Therefore, by preparing on purpose the light blue ink LB4 having a hue angle as shown in FIG. 10D, in all of the hue regions using both cyan ink and magenta ink, graininess is more positively suppressed. In contrast, therefore, in a situation in which lightness of cyan ink is lower than that of magenta ink and graininess of cyan ink is more conspicuous than graininess of magenta ink, light blue ink having a hue inclined toward cyan may be prepared to decrease the use frequency of cyan dots alone as compared to the use frequency of magenta dots alone.

In the above, a description has been given of the mode of using cyan, magenta, yellow, black, and light blue. However, combinations of color materials should not be limited to this. As long as cyan, magenta, and light blue are included, more color materials such as red and green may be added. Furthermore, in the above, a description has been given of the example of an ink jet printing apparatus that ejects ink as droplets, but the present invention should not be limited to such a mode. Any mode in which an image can be printed through a subtractive process may be applied to printing other than ink jet printing, such as an electrophotographic process. In either case, as long as the color materials of cyan, magenta, and light blue in a combination satisfying the above condition 1 and condition 2 are prepared, graininess can be suppressed in all gradations and hues as compared to the conventional one.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-156823 filed Aug. 7, 2015, which is hereby incorporated by reference wherein in its entirety.

What is claimed is:

1. An image printing apparatus for printing an image on a print medium by using a plurality of color materials including at least cyan, magenta, and light blue, the image printing apparatus comprising:

a print head to print a dot corresponding to each of the plurality of color materials according to a signal, wherein the color material of light blue satisfies:

$$\Delta L_B \geq (\Delta L_C - \Delta L_B) > 0 \text{ and}$$

$$\Delta L_B \geq (\Delta L_M - \Delta L_B) > 0$$

where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $$\Delta L_C < \Delta L_M \text{ and}$$

$$h_{(C+M)} < h_B \leq h_M - (h_M - h_{(C+M)})/2$$

where $h_M$ represents a hue angle of the image printed on the print medium with the color material of magenta, $h_{(C+M)}$ represents a hue angle of the image printed on the print medium with the color material of cyan and the color material of magenta in the same amount, and $h_B$ represents a hue angle of the image printed on the print medium with the color material of light blue.

2. The image printing apparatus according to claim 1, further comprising:
one or more processors which executes the following steps of:
generating a multi-valued density signal corresponding to each of the plurality of color materials; and
generating a signal for each of the plurality of color materials by quantizing each of the multi-valued density signals, the signal defining printing or non-printing of a dot on the print medium.

3. The image printing apparatus according to claim 2, wherein, in a case where the multi-valued density signal corresponding to the color material of light blue represents a density between a highlight and a halftone, the signal defines printing or non-printing of a dot such that dots of the color material of light blue do not overlap each other on the print medium.

4. The image printing apparatus according to claim 1, wherein the plurality of color materials further include color materials of yellow and black.

5. The image printing apparatus according to claim 1, wherein the plurality of color materials are dye inks.

6. The image printing apparatus according to claim 1, wherein the plurality of color materials are pigment inks.

7. The image printing apparatus according to claim 1, wherein, in a gradation area from white to black through blue,
in a case of representing a tone of blue color, a printing rate of the color material of cyan and a printing rate of the color material of magenta are larger than a printing rate of the color material of light blue, and
in a case of representing a tone between blue color and white color, a printing rate of the color material of light blue is larger than a printing rate of the color material of cyan and a printing rate of the color material of magenta ink.

8. An image printing method for printing an image on a print medium by using a plurality of color materials including at least cyan, magenta, and light blue, the image printing method comprising:
a printing step of a print head printing a dot corresponding to each of the plurality of color materials according to a signal,
wherein
the color material of light blue satisfies:

$\Delta L_B \geq (\Delta L_C - \Delta L_B) > 0$ and $\Delta L_B \geq (\Delta L_M - \Delta L_B) > 0$ where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $\Delta L_C < \Delta L_M$ and $h_{(C+M)} < h_B \leq h_M - (h_M - h_{(C+M)})/2$ where $h_M$ represents a hue angle of the image printed on the print medium with the color material of magenta, $h_{(C+M)}$ represents a hue angle of the image printed on the print medium with the color material of cyan and the color material of magenta in the same amount, and $h_B$ represents a hue angle of the image printed on the print medium with the color material of light blue.

9. The image printing method according to claim 8, further comprising:
a first generating step of generating a multi-valued density signal corresponding to each of the plurality of color materials; and
a second generating step of generating a signal for each of the plurality of color materials by quantizing each of the multi-valued density signals, the signal defining printing or non-printing of a dot on the print medium.

10. The image printing method according to claim 9, wherein, in a case where the multi-valued density signal corresponding to the color material of light blue represents a density between a highlight and a halftone, the signal defines printing or non-printing of a dot such that dots of the color material of light blue do not overlap each other on the print medium.

11. The image printing method according to claim 8, wherein the plurality of color materials further include color materials of yellow and black.

12. The image printing method according to claim 8, wherein the plurality of color materials are dye inks.

13. The image printing method according to claim 8, wherein the plurality of color materials are pigment inks.

14. The image printing method according to claim 8, wherein in a gradation area from white to black through blue,
in a case of representing a tone of blue color a printing rate of the color, material of cyan and a printing rate of the color material of magenta are larger than a printing rate of the color material of light blue, and
in a case of representing a tone between blue color and white color, a printing rate of the color material of light blue is larger than a printing rate of the color material of cyan and a printing rate of the color material of magenta ink.

15. An image printing apparatus for printing an image on a print medium by using a plurality of color materials including at least cyan, magenta, and light blue, the image printing apparatus comprising:
a printing head to print a dot corresponding to each of the plurality of color materials according to signal,
wherein
the color material of light blue satisfies:

$\Delta L_B \geq (\Delta L_C - \Delta L_B) > 0$ and $\Delta L_B \geq (\Delta L_M - \Delta L_B) > 0$ where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $\Delta L_C > \Delta L_M$ and $h_C + (h_{(C+M)} - h_C)/2 \leq h_B < h_{(C+M)}$ where $h_C$ represents a hue angle on an a*b* plane of the image printed on the print medium with the color material of cyan, $h_{(C+M)}$ represents a hue angle of the image printed on the print medium with the color material of cyan and the color material of magenta in the same amount, and $h_B$ represents a hue angle of the image printed on the print medium with the color material of light blue.

16. The image printing apparatus according to claim 15, further comprising:
one or more processor which executes the following steps of:
generating a multi-valued density signal corresponding to each of the plurality of color materials; and
generating a signal for each of the plurality of color materials by quantizing each of the multi-valued density signals, the signal defining printing or non-printing of a dot on the print medium.

17. The image printing apparatus according to claim 16, wherein, in a case where the multi-valued density signal corresponding to the color material of light blue represents a density between a highlight and a halftone, the signal defines printing or non-printing of a dot such that dots of the color material of light blue do not overlap each other on the print medium.

18. The image printing apparatus according to claim 15, wherein the plurality of color materials further include color materials of yellow and black.

19. The image printing apparatus according to claim 15, wherein the plurality of color materials are dye inks.

20. The image printing apparatus according to claim 15, wherein the plurality of color materials are pigment inks.

21. The image printing apparatus according to claim 15, wherein in a gradation area from white to black through blue,
in a case of representing a tone of blue color a printing rate of the color, material of cyan and a printing rate of the color material of magenta are larger than a printing rate of the color material of light blue, and
in a case of representing a tone between blue color and white color, a printing rate of the color material of light blue is larger than a printing rate of the color material of cyan and a printing rate of the color material of magenta ink.

22. An image printing method for printing an image on a print medium by using a plurality of color materials including at least cyan, magenta, and light blue, the image printing apparatus comprising:
a printing step of printing a dot corresponding to each of the plurality of color materials according to signal, wherein
the color material of light blue satisfies:

$\Delta L_B \geq (\Delta L_C - \Delta L_B) > 0$ and $\Delta L_B \geq (\Delta L_M - \Delta L_B) > 0$ where $\Delta L_C$ represents a difference between lightness of the image printed on the print medium with the color material of cyan and lightness of a blank area in the print medium, $\Delta L_M$ represents a difference between lightness of the image printed on the print medium with the color material of magenta and lightness of the blank area in the print medium, and $\Delta L_B$ represents a difference between lightness of the image printed on the print medium with the color material of light blue and lightness of the blank area in the print medium; and $\Delta L_C > \Delta L_M$ and $h_C + (h_{(C+M)} - h_C)/2 \leq h_B < h_{(C+M)}$ where $h_C$ represents a hue angle on an a*b* plane of the image printed on the print medium with the color material of cyan, $h_{(C+M)}$ represents a hue angle of the image printed on the print medium with the color material of cyan and the color material of magenta in the same amount, and $h_B$ represents a hue angle of the image printed on the print medium with the color material of light blue.

23. The image printing method according to claim 22, further comprising:
a first generating step of generating a multi-valued density signal corresponding to each of the plurality of color materials; and
a second generating step of generating a signal for each of the plurality of color materials by quantizing each of the multi-valued density signals, the signal defining printing or non-printing of a dot on the print medium.

24. The image printing method according to claim 23, wherein, in a case where the multi-valued density signal corresponding to the color material of light blue represents a density between a highlight and a halftone, the signal defines printing or non-printing of a dot such that dots of the color material of light blue do not overlap each other on the print medium.

25. The image printing method according to claim 22, wherein the plurality of color materials further include color materials of yellow and black.

26. The image printing method according to claim 22, wherein the plurality of color materials are dye inks.

27. The image printing method according to claim 22, wherein the plurality of color materials are pigment inks.

28. The image printing method according to claim 22, wherein in a gradation area from white to black through blue,
in a case of representing a tone of blue color a printing rate of the color, material of cyan and a printing rate of the color material of magenta are larger than a printing rate of the color material of light blue, and
in a case of representing a tone between blue color and white color, a printing rate of the color material of light blue is larger than a printing rate of the color material of cyan and a printing rate of the color material of magenta ink.

* * * * *